(12) United States Patent
Suzuki et al.

(10) Patent No.: US 11,044,638 B2
(45) Date of Patent: Jun. 22, 2021

(54) TERMINAL DEVICE, BASE STATION DEVICE, COMMUNICATION METHOD, AND INTEGRATED CIRCUIT

(71) Applicant: SHARP KABUSHIKI KAISHA, Sakai (JP)

(72) Inventors: Shoichi Suzuki, Sakai (JP); Tatsushi Aiba, Sakai (JP); Kazunari Yokomakura, Sakai (JP); Wataru Ouchi, Sakai (JP); Takashi Hayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 182 days.

(21) Appl. No.: 15/770,723

(22) PCT Filed: Aug. 15, 2016

(86) PCT No.: PCT/JP2016/073822
§ 371 (c)(1),
(2) Date: Apr. 24, 2018

(87) PCT Pub. No.: WO2017/073135
PCT Pub. Date: May 4, 2017

(65) Prior Publication Data
US 2019/0075492 A1    Mar. 7, 2019

(30) Foreign Application Priority Data
Oct. 29, 2015    (JP) .............................. JP2015-212700

(51) Int. Cl.
*H04W 28/18*    (2009.01)
*H04L 5/00*    (2006.01)
(Continued)

(52) U.S. Cl.
CPC ............... *H04W 28/18* (2013.01); *H04L 1/00* (2013.01); *H04L 1/001* (2013.01); *H04L 1/0003* (2013.01);
(Continued)

(58) Field of Classification Search
None
See application file for complete search history.

(56) References Cited

U.S. PATENT DOCUMENTS 9,414,409 B2 * 8/2016 Kim .................. H04L 1/1861
2012/0327883 A1 * 12/2012 Yang .................. H04L 1/0026
370/329
(Continued)

OTHER PUBLICATIONS

"Motivation for Work Item on UL 256QAM for LTE", RP-151287, Ericsson, 3GPP TSG RAN #70, Phoenix, USA, Sep. 14-16, 2015.
(Continued)

*Primary Examiner* — Noel R Beharry
*Assistant Examiner* — Rodrick Mak
(74) *Attorney, Agent, or Firm* — ScienBiziP, P.C.

(57) ABSTRACT

A terminal device and a base station device are capable of communicating with each other efficiently using an uplink channel. The terminal device transmits a transport block on a first shared channel upon detection of a control channel including first control information. For the first control information along with a CRC parity bit scrambled by a first identifier, a size of the transport block is given using a first information field included in the first control information along with the CRC parity bit scrambled by the first identifier, based on whether a second shared channel for an initial transmission of a transport block identical to the transport block corresponding to the first control information is scheduled by a random access response grant.

6 Claims, 16 Drawing Sheets

(51) Int. Cl.

| | |
|---|---|
| *H04L 1/00* | (2006.01) |
| *H04L 1/18* | (2006.01) |
| *H04W 72/04* | (2009.01) |
| *H04W 72/12* | (2009.01) |
| *H04W 74/08* | (2009.01) |
| *H04L 1/16* | (2006.01) |

(52) U.S. Cl.
CPC .......... *H04L 1/0004* (2013.01); *H04L 1/0009* (2013.01); *H04L 1/0061* (2013.01); *H04L 1/0072* (2013.01); *H04L 1/1819* (2013.01); *H04L 5/001* (2013.01); *H04L 5/0044* (2013.01); *H04L 5/0053* (2013.01); *H04L 5/0094* (2013.01); *H04W 72/0413* (2013.01); *H04W 72/1284* (2013.01); *H04W 74/0833* (2013.01); *H04L 1/1671* (2013.01); *H04L 1/1822* (2013.01); *H04L 1/1864* (2013.01); *H04W 72/042* (2013.01)

(56) References Cited

U.S. PATENT DOCUMENTS

| | | | | |
|---|---|---|---|---|
| 2013/0039334 | A1* | 2/2013 | Han et al. ................ | 370/330 |
| 2013/0235820 | A1* | 9/2013 | Wu ................... | H04W 76/14 |
| | | | | 370/329 |
| 2013/0286961 | A1* | 10/2013 | Vermani ............... | H04L 1/0025 |
| | | | | 370/329 |
| 2015/0215068 | A1* | 7/2015 | Wu ................... | H04L 1/0016 |
| | | | | 370/329 |
| 2015/0282183 | A1* | 10/2015 | Sverdlov ............... | H04L 23/00 |
| | | | | 370/329 |
| 2017/0311344 | A1* | 10/2017 | Lee ................... | H04W 56/00 |
| 2018/0368172 | A1* | 12/2018 | Li et al. ............... | H04W 72/14 |
| 2019/0082452 | A1* | 3/2019 | Zheng et al. ........ | H04W 72/1268 |
| 2019/0150179 | A1* | 5/2019 | Soriaga et al. ...... | H04W 72/1284 |

OTHER PUBLICATIONS

3rd Generation Partnership Project; Technical Specification Group Radio Access Network; Evolved Universal Terrestrial Radio Access (E-UTRA); Physical channels and modulation (Release 12), "3GPP TS 36.211 V12.7.0 (Sep. 2015)", Sep. 25, 2015.

3rd Generation Partnership Project; Technical Specification Group Radio Access Network; Evolved Universal Terrestrial Radio Access (E-UTRA); Multiplexing and channel coding (Release 12), "3GPP TS 36.212 V12.6.0 (Sep. 2015)", Sep. 25, 2015.

3rd Generation Partnership Project;Technical Specification Group Radio Access Network; Evolved Universal Terrestrial Radio Access (E-UTRA); Physical layer procedures (Release 12), "3GPP TS 36.213 V12.7.0 (Sep. 2015)", Sep. 25, 2015.

TSG RAN WG1, "CR to 36.213 on corrections for Dual Connectivity feature", 3GPP TSG-RAN Meeting #67 RP-150365, Mar. 5, 2015, pp. 140-148, online, retrieved on Aug. 16, 2016, retrieved from the Internet (URL: http://www.3gpp.org/ftp/tsg_ran/TSG_RAN/TSGR_67/Docs/RP-150365.zip).

"3 Generation Partnership Project; Technical Specification Group Radio Access Network; Evolved Universal Terrestrial Radio Access (E-UTRA); Physical layer procedures (Release 12)", 3GPP Standard; 3GPP TS 36.213, 3re Generation Partnership Project (3GPP), Mobile Competence Centre; 650, Route Des Lucioles ; F-06921 Sophia-Antipolis Cedex ; France, vol. RAN WG1, No. V12.6.0, Jul. 3, 2015 (Jul. 3, 2015), pp. 6-165, XP050965828.

"3rd Generation Partnership Project; Technical Specification Group Radio Access Network; Evolved Universal Terrestrial Radio Access (E-UTRA); Medium Access Control (MAC) protocol specification (Release 12)", 3GPP Standard; 3GPP TS 36.321, 3rd Generation Partnership Project (3GPP), Mobile Competence Centre; 650, Route Des Lucioles ; F-06921 Sophia-Antipolis Cedex ; France, vol. RAN WG2, No. V12.7.0, Sep. 24, 2015 (Sep. 24, 2015), pp. 1-77, XP050996302.

* cited by examiner

DCI format 0 (500):

(a) 'Resource block assignment and hopping resource allocation' field (b) 'Modulation and coding scheme and redundancy version' field (c) 'New data indicator' field

DCI format 4 (502):

(d) 'Resource block assignment' field

In addition, for transport block 1:

(e) 'Modulation and coding scheme and redundancy version' field (f) 'New data indicator' field In addition, for transport block 2:

(g) 'Modulation and coding scheme and redundancy version' field (h) 'New data indicator' field

Random access response grant (504):

(i) 'Fixed size resource block assignment' field (j) 'Truncated modulation and coding scheme' field

FIG. 5

| MCS Index $I_{MCS}$ | $Q'_m$ | TBS Index $I_{TBS}$ | Redundancy Version $rv_{idx}$ |
|---|---|---|---|
| 0 | 2 (QPSK) | 0 | 0 |
| 1 | 2 (QPSK) | 2 | 0 |
| 2 | 2 (QPSK) | 4 | 0 |
| 3 | 2 (QPSK) | 6 | 0 |
| 4 | 2 (QPSK) | 8 | 0 |
| 5 | 4 (16QAM) | 10 | 0 |
| 6 | 4 (16QAM) | 11 | 0 |
| 7 | 4 (16QAM) | 12 | 0 |
| 8 | 4 (16QAM) | 13 | 0 |
| 9 | 4 (16QAM) | 14 | 0 |
| 10 | 4 (16QAM) | 15 | 0 |
| 11 | 6 (64QAM) | 16 | 0 |
| 12 | 6 (64QAM) | 17 | 0 |
| 13 | 6 (64QAM) | 18 | 0 |
| 14 | 6 (64QAM) | 19 | 0 |
| 15 | 6 (64QAM) | 20 | 0 |
| 16 | 6 (64QAM) | 21 | 0 |
| 17 | 6 (64QAM) | 22 | 0 |
| 18 | 6 (64QAM) | 23 | 0 |
| 19 | 6 (64QAM) | 24 | 0 |
| 20 | 8 (256QAM) | 25 | 0 |
| 21 | 8 (256QAM) | 26 | 0 |
| 22 | 8 (256QAM) | 27 | 0 |
| 23 | 8 (256QAM) | 28 | 0 |
| 24 | 8 (256QAM) | 29 | 0 |
| 25 | 8 (256QAM) | 30 | 0 |
| 26 | 8 (256QAM) | 31 | 0 |
| 27 | 8 (256QAM) | 32 | 0 |
| 28 | 8 (256QAM) | 33 | 0 |
| 29 | reserved | | 1 |
| 30 | reserved | | 2 |
| 31 | reserved | | 3 |

FIG. 7

| MCS Index $I_{MCS}$ | $Q'_m$ | TBS Index $I_{TBS}$ | Redundancy Version $rv_{idx}$ |
|---|---|---|---|
| 0 | 2 (QPSK) | 0 | 0 |
| 1 | 2 (QPSK) | 1 | 0 |
| 2 | 2 (QPSK) | 2 | 0 |
| 3 | 2 (QPSK) | 3 | 0 |
| 4 | 2 (QPSK) | 4 | 0 |
| 5 | 2 (QPSK) | 5 | 0 |
| 6 | 2 (QPSK) | 6 | 0 |
| 7 | 2 (QPSK) | 7 | 0 |
| 8 | 2 (QPSK) | 8 | 0 |
| 9 | 2 (QPSK) | 9 | 0 |
| 10 | 2 (QPSK) | 10 | 0 |
| 11 | 4 (16QAM) | 10 | 0 |
| 12 | 4 (16QAM) | 11 | 0 |
| 13 | 4 (16QAM) | 12 | 0 |
| 14 | 4 (16QAM) | 13 | 0 |
| 15 | 4 (16QAM) | 14 | 0 |
| 16 | 4 (16QAM) | 15 | 0 |
| 17 | 4 (16QAM) | 16 | 0 |
| 18 | 4 (16QAM) | 17 | 0 |
| 19 | 4 (16QAM) | 18 | 0 |
| 20 | 4 (16QAM) | 19 | 0 |
| 21 | 6 (64QAM) | 19 | 0 |
| 22 | 6 (64QAM) | 20 | 0 |
| 23 | 6 (64QAM) | 21 | 0 |
| 24 | 6 (64QAM) | 22 | 0 |
| 25 | 6 (64QAM) | 23 | 0 |
| 26 | 6 (64QAM) | 24 | 0 |
| 27 | 6 (64QAM) | 25 | 0 |
| 28 | 6 (64QAM) | 26 | 0 |
| 29 | | | 1 |
| 30 | | reserved | 2 |
| 31 | | | 3 |

FIG. 8

| TBS Index $I_{TBS}$ | The total number of allocated PRBs $N_{PRB}$ | | | |
|---|---|---|---|---|
| | 1 | 2 | ... | 100 |
| 0 | 16 | 32 | ... | 2792 |
| 1 | 24 | 56 | ... | 3624 |
| 2 | 32 | 72 | ... | 4584 |
| 3 | 40 | 104 | ... | 5736 |
| ... | ... | ... | ... | ... |
| 32 | 840 | 1672 | ... | 84760 |
| 33 | 968 | 1992 | ... | 97896 |

FIG. 9

(1000) For $0 \leq I_{MCS} \leq 28$, the TBS index ($I_{TBS}$) for the transport block in the PUSCH in the serving cell is determined as follows (1001 to 1008):

- (1001) If the higher layer parameter *enable256QAM* is configured for the serving cell, and if the PUSCH is scheduled by a PDCCH/EPDCCH with the first DCI format with CRC scrambled by C-RNTI and if the initial PUSCH for the same transport block is not scheduled by the random access response grant,

- (1002) the TBS index ($I_{TBS}$) for the PUSCH is given by using $I_{MCS}$ and the table indicated by Figure 7.

- (1003) If the higher layer parameter *enable256QAM* is configured for the serving cell, and if the PUSCH is scheduled by a PDCCH/EPDCCH with the first DCI format with CRC scrambled by C-RNTI and if the initial PUSCH for the same transport block is scheduled by the random access response grant; or

- (1004) If the higher layer parameter *enable256QAM* is configured for the serving cell, and if the PUSCH is scheduled by a PDCCH/EPDCCH with the second DCI format with CRC scrambled by C-RNTI; or

- (1005) If the higher layer parameter *enable256QAM* is configured for the serving cell, and if the PUSCH is scheduled by a PDCCH/EPDCCH with first or second DCI format with CRC scrambled by RNTI other than C-RNTI (for example SPS C-RNTI or temporary C-RNTI); or

- (1006) If the higher layer parameter *enable256QAM* is configured for the serving cell, and if the PUSCH is scheduled by a random access response grant; or

- (1007) If the higher layer parameter *enable256QAM* is not configured for the serving cell,

- (1008) the TBS index ($I_{TBS}$) for the PUSCH is given by using $I_{MCS}$ and the table indicated by Figure 8.

FIG. 10

(1100) For $29 \leq I_{MCS} \leq 31$, the TBS index ($I_{TBS}$) for the transport block in the PUSCH in the serving cell is determined as follows (1101 to 1104):

- (1101) If there is PDCCH/EPDCCH with first or second DCI format for the same transport block using $0 \leq I_{MCS} \leq 28$, the TBS index ($I_{TBS}$) shall be determined from the DCI transported in the latest PDCCH/EPDCCH with first or second DCI format for the same transport block using $0 \leq I_{MCS} \leq 28$, according to (1002) or (1008) in Figure 10.

- (1102) Else if there is no PDCCH/EPDCCH with first or second DCI format for the same transport block using $0 \leq I_{MCS} \leq 28$,

- (1103) the TBS index ($I_{TBS}$) shall be determined from the most recent semi-persistent scheduling assignment PDCCH/EPDCCH according to (1008) in Figure 10, when the initial PUSCH for the same transport block is semi-persistently scheduled, or,

- (1104) the TBS index ($I_{TBS}$) shall be determined from the random access response grant for the same transport block according to (1008) in Figure 10, when the PUSCH is initiated by the random access response grant.

FIG. 11

(1200) For $0 \leq I_{MCS} \leq 28$, the modulation order ($Q_m$) for the PUSCH in the serving cell is determined as follows (1201 to 1210):

- (1201) If the higher layer parameter *enable256QAM* is configured for the serving cell, and if the PUSCH is scheduled by a PDCCH/EPDCCH with the first DCI format with CRC scrambled by C-RNTI and if the initial PUSCH for the same transport block is not scheduled by the random access response grant,

- (1202) the modulation order ($Q_m$) is given by $Q'_m$ in the table indicated by Figure 7.

- (1203) If the higher layer parameter *enable256QAM* is configured for the serving cell, and if the PUSCH is scheduled by a PDCCH/EPDCCH with the first DCI format with CRC scrambled by C-RNTI and if the initial PUSCH for the same transport block is scheduled by the random access response grant; or

- (1204) If the higher layer parameter *enable256QAM* is configured for the serving cell, and if the PUSCH is scheduled by a PDCCH/EPDCCH with the second DCI format with CRC scrambled by C-RNTI; or

- (1205) If the higher layer parameter *enable256QAM* is configured for the serving cell, and if the PUSCH is scheduled by a PDCCH/EPDCCH with first or second DCI format with CRC scrambled by RNTI other than C-RNTI (for example SPS C-RNTI or temporary C-RNTI); or

- (1206) If the higher layer parameter *enable256QAM* is configured for the serving cell, and if the PUSCH is scheduled by a random access response grant; or

- (1207) If the higher layer parameter *enable256QAM* is not configured for the serving cell and the higher layer parameter *enable64QAM* is configured for the serving cell,

- (1208) the modulation order ($Q_m$) is given by $Q'_m$ in the table indicated by Figure 8.

- (1209) If the higher layer parameters *enable256QAM* and *enable64QAM* are not configured for the serving cell,

- (1210) $Q'_m$ is first read from the table indicated by Figure 8 and the modulation order ($Q_m$) is set to $Q_m = \min(4, Q'_m)$.

FIG. 12

(1300) For $29 \leq I_{MCS} \leq 31$, the modulation order ($Q_m$) for the PUSCH in the serving cell is determined as follows (1301 to 1304):

- (1301) If there is PDCCH/EPDCCH with DCI format 0/4 for the same transport block using $0 \leq I_{MCS} \leq 28$, the modulation order ($Q_m$) shall be determined from the DCI transported in the latest PDCCH/EPDCCH with first or second DCI format for the same transport block using $0 \leq I_{MCS} \leq 28$, according to (1202), (1208) or (1210) in Figure 12.

- (1302) Else if there is no PDCCH/EPDCCH with DCI format 0/4 for the same transport block using $0 \leq I_{MCS} \leq 28$, the modulation order ($Q_m$) shall be determined from

- (1303) the most recent semi-persistent scheduling assignment PDCCH/EPDCCH according to (1208) or (1210) in Figure 12, when the initial PUSCH for the same transport block is semi-persistently scheduled, or,

- (1304) the random access response grant for the same transport block according to (1208) or (1210) in Figure 12, when the PUSCH is initiated by the random access response grant.

FIG. 13

(1400) The redundancy version ($rv_{idx}$) to use in the PUSCH in the serving cell is determined as follows (1401 to 1404):

- (1401) For $0 \leq I_{MCS} \leq 28$, the redundancy version ($rv_{idx}$) is '0'.

- (1402) For $I_{MCS} = 29$, the redundancy version ($rv_{idx}$) is '1'.

- (1403) For $I_{MCS} = 30$, the redundancy version ($rv_{idx}$) is '2'.

- (1404) For $I_{MCS} = 31$, the redundancy version ($rv_{idx}$) is '3'.

FIG. 14

TERMINAL DEVICE, BASE STATION DEVICE, COMMUNICATION METHOD, AND INTEGRATED CIRCUIT

This application claims priority based on Japanese Patent Application No. 2015-212700 filed on Oct. 29, 2015, the contents of which are incorporated herein by reference.

TECHNICAL FIELD

The present invention relates to a terminal device, a base station device, a communication method, and an integrated circuit.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied. In LTE, a base station device is also referred to as an evolved NodeB (eNodeB), and a terminal device is also referred to as User Equipment (UE). LTE is a cellular communication system in which an area is divided into multiple cells to form a cellular pattern, each of the cells being served by a base station device. A single base station device may manage multiple cells.

For an LTE Physical Downlink Shared CHannel (PDSCH), Quadrature Phase Shift Keying (QPSK), 16 Quadrature Amplitude Modulation (QAM), 64 QAM, and 256 QAM can be used. For an LTE Physical Uplink Shared CHannel (PUSCH), QPSK, 16 QAM, and 64 QAM can be used. In the 3GPP, introducing 256 QAM to the Physical Uplink Shared CHannel (PUSCH) has been studied in order to increase uplink data rate (NPL 1).

CITATION LIST

Non-Patent Literature

NPL 1: "Motivation for Work Item on UL 256 QAM for LTE", RP-151287, Ericsson, 3GPP TSG RAN Meeting #68, Phoenix, USA, 14-16 Sep. 2015.

NPL 2: "3GPP TS 36.211 V12.7.0 (2015-09)", 25 Sep. 2015.

NPL 3: "3GPP TS 36.212 V12.6.0 (2015-09)", 25 Sep. 2015.

NPL 4: "3GPP TS 36.213 V12.7.0 (2015-03)", 25 Sep. 2015.

DISCLOSURE OF THE INVENTION

Problems to be Solved by the Invention

The present invention has been made in light of the foregoing, and an object of the present invention is to provide a terminal device capable of communicating with a base station device efficiently using an uplink channel, a base station device that communicates with the terminal device, a communication method used by the terminal device, a communication method used by the base station device, an integrated circuit mounted on the terminal device, and an integrated circuit mounted on the base station device.

Means for Solving the Problems (1) According to some aspects of the present invention, the following measures are provided. Specifically, a first aspect of the present invention is a terminal device including: a reception unit configured to receive a control channel including first control information; and a transmission unit configured to transmit a transport block or a first shared channel upon detection of the control channel including the first control information. For the first control information along with a CRC parity bit scrambled by a first identifier, a size of the transport block is given using a first information field included in the first control information along with the CRC parity bit scrambled by the first identifier, based on whether a second shared channel for initial transmission of a transport block identical to the transport block corresponding to the first control information is scheduled by a random access response grant.

(2) A second aspect of the present invention is a base station device including: a transmission unit configured to transmit a control channel including first control information; and a reception unit configured to receive a transport block on a first shared channel based on transmission of the control channel including the first control information. For the first control information along with a CRC parity bit scrambled by a first identifier, a size of the transport block is given using a first information field included in the first control information along with the CRC parity bit scrambled by the first identifier, based on whether a second shared channel for initial transmission of a transport block identical to the transport block corresponding to the first control information is scheduled by a random access response grant.

(3) A third aspect of the present invention is a communication method to be used by a terminal device, the communication method including: receiving a control channel including first control information; and transmitting a transport block on a first shared channel upon detection of the control channel including the first control information. For the first control information along with a CRC parity bit scrambled by a first identifier, a size of the transport block is given using a first information field included in the first control information along with the CRC parity bit scrambled by the first identifier, based on whether a second shared channel for initial transmission of a transport block identical to the transport block corresponding to the first control information is scheduled by a random access response grant.

(4) A fourth aspect of the present invention is a communication method to be used by a base station device, the communication method including: transmitting a control channel including first control information; and receiving a transport block in a first shared channel based on transmission of the control channel including the first control information. For the first control information along with a CRC parity bit scrambled by a first identifier, a size of the transport block is given using a first information field included in the first control information along with the CRC parity bit scrambled by the first identifier, based on whether a second shared channel for initial transmission of a transport block identical to the transport block corresponding to the first control information is scheduled by a random access response grant.

(5) A fifth aspect of the present invention is an integrated circuit to be implemented in a terminal device, the integrated circuit including: a reception circuit configured to receive a control channel including first control information; and a transmission circuit configured to transmit a transport block on a first shared channel upon detection of the control channel including the first control information. For the first control information along with a CRC parity bit scrambled by a first identifier, a size of the transport block is given using a first information field included in the first control information along with the CRC parity bit scrambled by the first identifier, based on whether a second shared channel for initial transmission of a transport block identical to the transport block corresponding to the first control information is scheduled by a random access response grant.

(6) A sixth aspect of the present invention is an integrated circuit to be implemented in a base station device, the integrated circuit including: a transmission circuit configured to transmit a control channel including first control information; and a reception circuit configured to receive a transport block in a first shared channel based on transmission of the control channel including the first control information. For the first control information along with a CRC parity bit scrambled by a first identifier, a size of the transport block is given using a first information field included in the first control information along with the CRC parity bit scrambled by the first identifier, based on whether a second shared channel for initial transmission of a transport block identical to the transport block corresponding to the first control information is scheduled by a random access response grant.

Effects of the Invention

According to the present invention, a terminal device and a base station device are capable of communicating with each other efficiently using an uplink channel.

BRIEF DESCRIPTION OF THE DRAWINGS

FIG. 5 is a diagram illustrating one example of information included in an uplink grant according to the present embodiment.

FIG. 7 is a diagram illustrating a correspondence table of an MCS index ($I_{MCS}$), ($Q'_m$), a transport block size index ($I_{TBS}$), and a redundancy version ($rv_{idx}$) according to the present embodiment.

FIG. 8 is a diagram illustrating a correspondence table of the MSC index ($I_{MCS}$), ($Q'_m$), the transport block size index ($I_{TBS}$), and the redundancy version ($rv_{idx}$) according to the present embodiment.

FIG. 9 is a diagram illustrating the correspondence of the total number of allocated physical resource blocks ($N_{PRB}$), the transport block size index ($I_{TBS}$), and a transport block size according to the present embodiment.

FIG. 10 is a diagram illustrating a pseudo-code (1000) for determining the transport block size index ($I_{TBS}$) for a transport block in the PUSCH with respect to the MCS index ($I_{MCS}$) of 0 to 28 according to the present embodiment.

FIG. 11 is a diagram illustrating a pseudo-code (1100) for determining the transport block size ($I_{TBS}$) for the transport block in the PUSCH with respect to the MCS index ($I_{MCS}$) of 29 to 31 according to the present embodiment.

FIG. 12 is a diagram illustrating a pseudo-code (1200) for determining a modulation order ($Q_m$) for the PUSCH with respect to the MCS index ($I_{MCS}$) of 0 to 28 according to the present embodiment.

FIG. 13 is a diagram illustrating a pseudo-code (1300) for determining the modulation order ($Q_m$) for the PUSCH with respect to the MCS index ($I_{MCS}$) of 29 to 31 according to the present embodiment.

FIG. 14 is a diagram illustrating a pseudo-code (1400) for determining the redundancy version ($rv_{idx}$) for the PUSCH according to the present embodiment.

MODE FOR CARRYING OUT THE INVENTION

Embodiments of the present invention will be described below.

Figure 1:
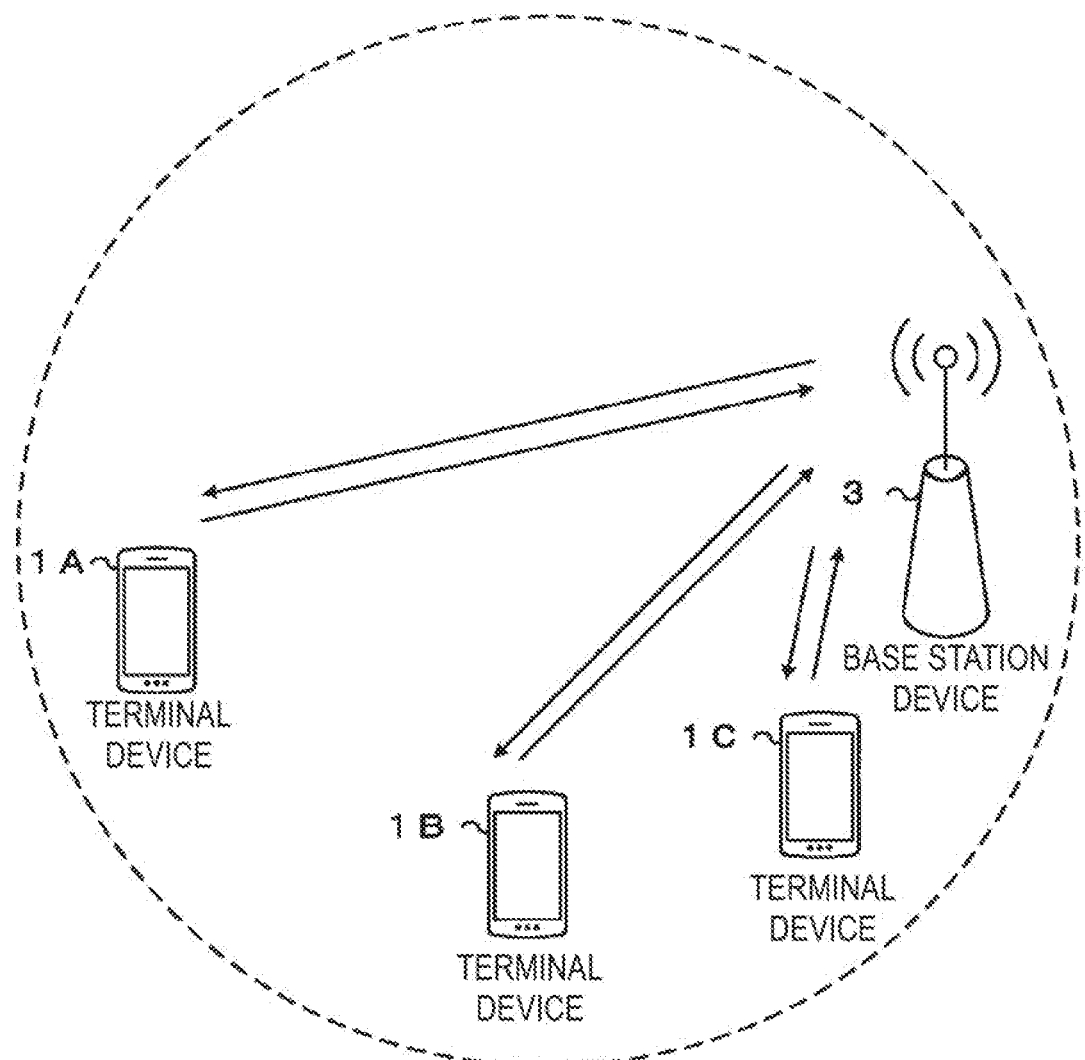
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. Each of or whole of the terminal devices 1A to 1C are referred to as a terminal device 1 below.

Carrier aggregation will be described below.

In the present embodiment, multiple serving cells are configured for the terminal device 1. A technology in which the terminal device 1 communicates via the multiple serving cells is referred to as cell aggregation or carrier aggregation. The present invention may be applied to each of the multiple serving cells configured for the terminal device 1. Furthermore, the present invention may be applied to some of the configured multiple serving cells. Furthermore, the present invention may be applied to each of groups of the configured multiple serving cells. Furthermore, the present invention may be applied to some of the groups of the configured multiple serving cells. In carrier aggregation, multiple serving cells thus configured are also referred to as aggregated serving cells.

Time Division Duplex (TDD) and/or Frequency Division Duplex (FDD) is applied to a radio communication system according to the present embodiment. In a case of cell aggregation, TDD may be applied to all of the multiple serving cells. Furthermore, in the case of cell aggregation, serving cells to which TDD is applied and serving cells to which FDD is applied may be aggregated. According to the present embodiment, a serving cell to which TDD is applied is also referred to as a TDD serving cell.

The configured multiple serving cells include one primary cell and one or multiple secondary cells. The primary cell is a serving cell in which an initial connection establishment procedure has been performed, a serving cell in which a connection reestablishment procedure has been started, or a cell indicated as a primary cell during a handover procedure. At the point of time when a Radio Resource Control (RRC) connection is established, or later, the secondary cell(s) may be configured.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 can perform simultaneous transmission of multiple physical channels/multiple physical signals in multiple aggregated serving cells (component careers). The terminal device 1 can perform simultaneous reception of multiple physical channels/multiple physical signals in multiple aggregated serving cells (component careers).

Figure 2:
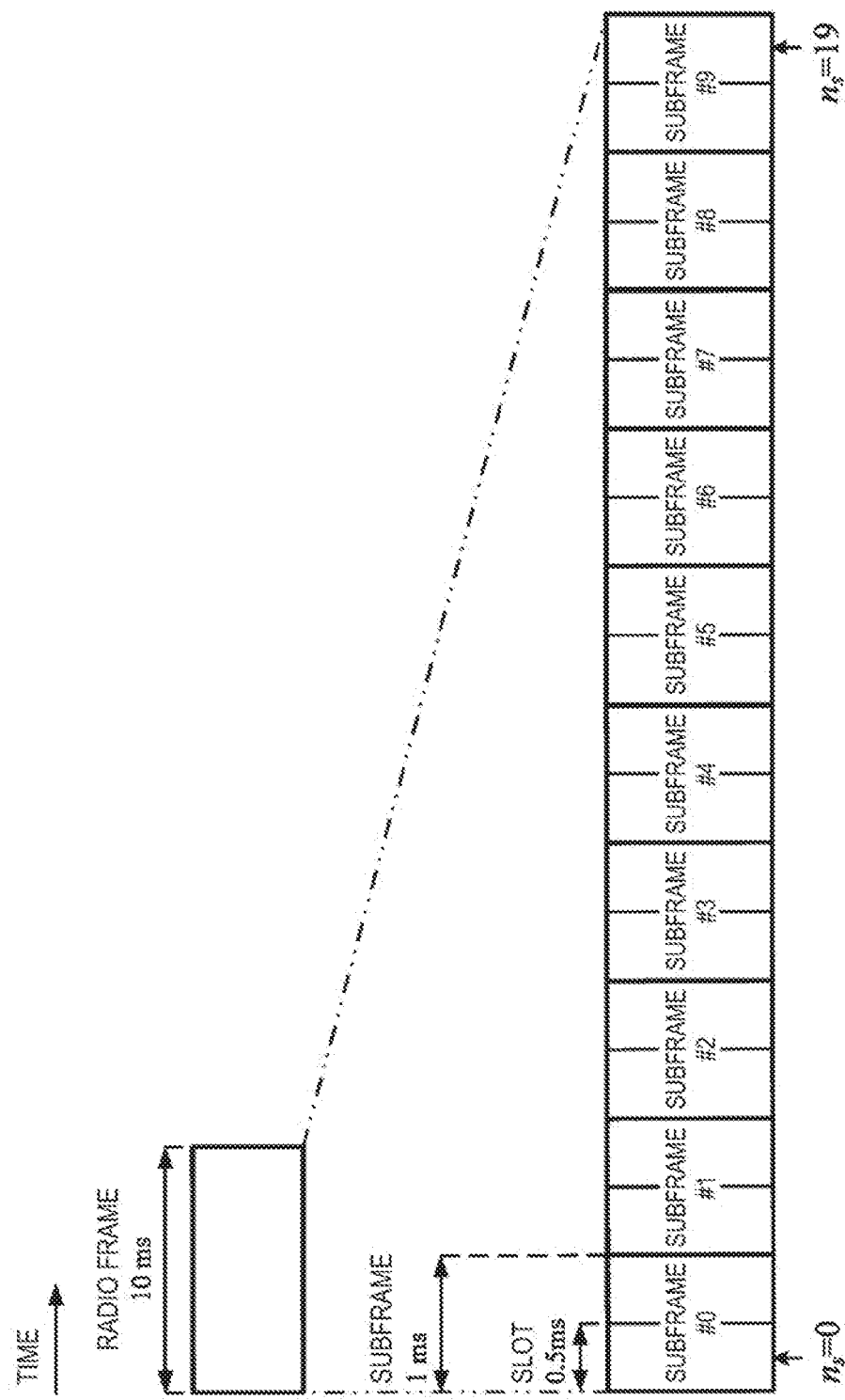
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis.

Various field sizes in the time domain are expressed by the number time units $T_s$, which is $T_s=1/(15000 \cdot 2048)$ seconds. A length $T_f$ of the radio frame is $T_f=307200 \cdot T_s=10$ ms. Each radio frame includes 10 subframes consecutive in the time domain. A length $T_{subframe}$ of each subframe is $T_{subframe}=30720 \cdot T_s=1$ ms. Each subframe i includes two slots consecutive in the time domain. The two slots consecutive in the time domain are a slot of which a slot number $n_s$ within the radio frame is 2i and a slot of which the slot number $n_s$ within the radio frame is 2i+1. A length $T_{slot}$ of each slot is $T_{slot}=153600 \cdot n_s=0.5$ ms. Each radio frame includes 10 subframes consecutive in the time domain. Each radio frame includes 20 slots (where $n_s=0, 1, \ldots, 19$) consecutive in the time domain.

Figure 3:
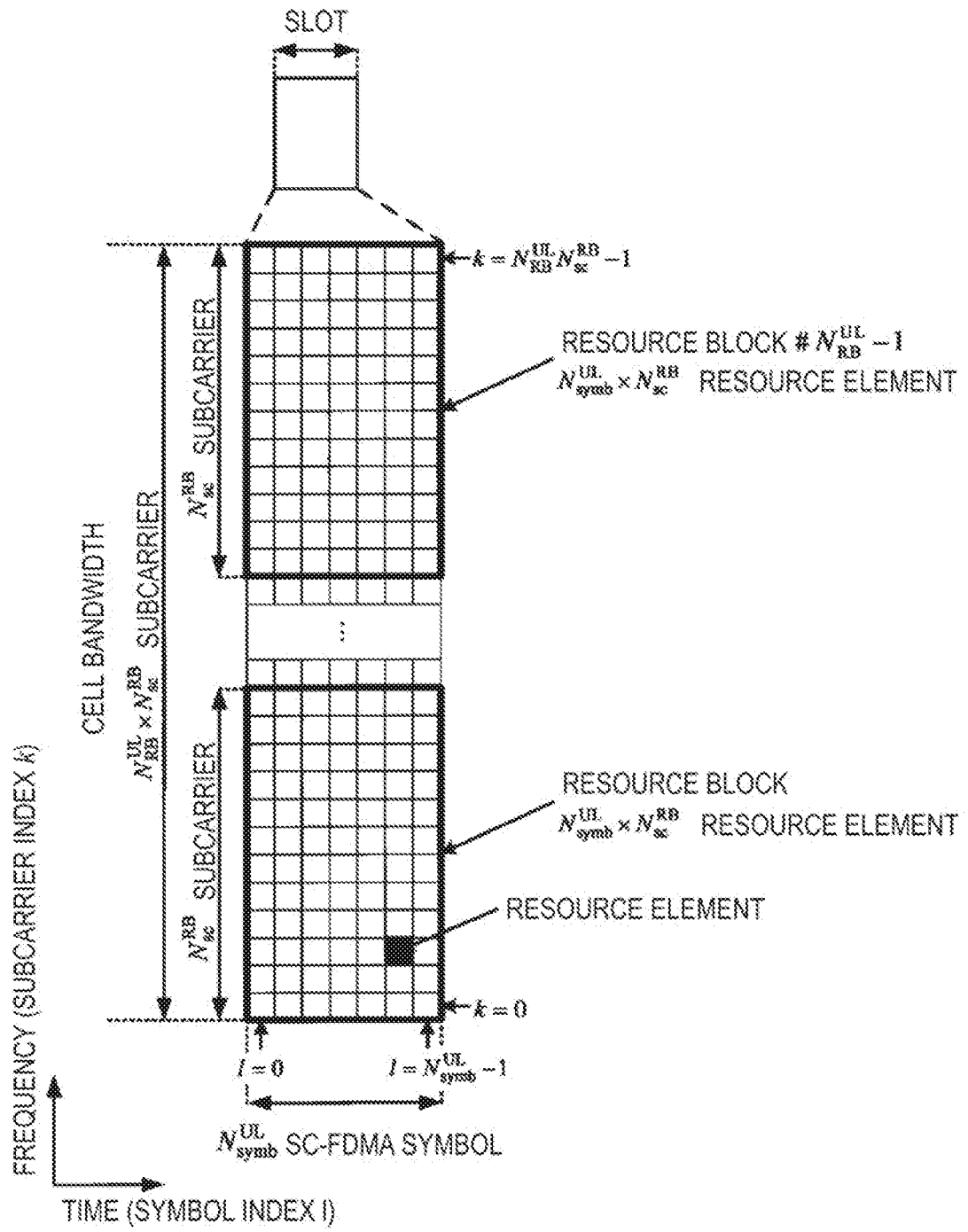
FIG. 3 is a diagram illustrating a schematic configuration of an uplink slot according to the present embodiment.

A configuration of the slot according to the present embodiment will be described below. FIG. 3 is a diagram illustrating a schematic configuration of an uplink slot according to the present embodiment. In FIG. 3, the configuration of the uplink slot in one cell is illustrated. In FIG. 3, the horizontal axis is a time axis, and the vertical axis is a frequency axis. In FIG. 3, 1 is a Single Carrier-Frequency Division Multiple Access (SC-FDMA) symbol number/index, and k is a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. A resource element is expressed by the subcarrier number/index k and the SC-FDMA symbol number/index 1.

The resource grid is defined for each antenna port. In the present embodiment, description will be given for one antenna port. The present embodiment may be applied to each of multiple antenna ports.

The uplink slot includes multiple SC-FDMA symbols 1 (where $l=0, 1, \ldots, N^{UL}_{symb}$) in the time domain. $N^{UL}_{symb}$ indicates the number of SC-FDMA symbols included in one uplink slot. For a normal Cyclic Prefix (CP), $N^{UL}_{symb}$ is 7. For an extended Cyclic Prefix (CP), $N^{UL}_{symb}$ is 6.

The uplink slot includes multiple subcarriers k (where $k=0, 1, \ldots, N^{UL}_{RB} \times N^{RB}_{sc}$) in the frequency domain. $N^{UL}_{RB}$ is an uplink bandwidth configuration for the serving cell, expressed by a multiple of $N^{RB}_{sc}$. $N^{RB}_{sc}$ is a (physical) resource block size in the frequency domain, expressed by the number of subcarriers. According to the present embodiment, a subcarrier interval $\Delta f$ is 15 kHz, and $N^{RB}_{sc}$ is 12 subcarriers. Specifically, according to the present embodiment, $N^{RB}_{sc}$ is 180 kHz.

A resource block is used to express mapping of a physical channel to a resource element. For the resource block, a virtual resource block and a physical resource block are defined. The physical channel is first mapped to the virtual resource block. Thereafter, the virtual resource block is mapped to the physical resource block. One physical resource block is defined by $N^{UL}_{symb}$ SC-FDMA symbols consecutive in the time domain and by $N^{RB}_{sc}$ subcarriers consecutive in the frequency domain. Therefore, one physical resource block is constituted of ($N^{UL}_{symb} \times N^{RB}_{sc}$) resource elements. One physical resource block corresponds to one slot in the time domain. Physical resource blocks are numbered (0, 1, \ldots, $N^{UL}_{RB}-1$) in order from low frequency in the frequency domain.

A downlink slot according to the present embodiment includes multiple OFDM symbols. The configuration of the downlink slot according to the present embodiment is the same, except that the resource grid is defined by multiple subcarriers and multiple OFDM symbols. Therefore, a description of the configuration of the downlink slot will be omitted.

The physical channels and physical signals according to the present embodiment will be described.

In FIG. 1, in uplink radio communication from the terminal device 1 to the base station device 3, the following uplink physical channels are used. The uplink physical channels are used by the physical layer to transmit information output from a higher layer.

Physical Uplink Control CHannel (PUCCH)
Physical Uplink Shared CHannel (PUSCH)
Physical Random Access CHannel (PRACH)

The PUCCH is used to transmit Uplink Control Information (UCI). The uplink control information includes: downlink Channel State Information (CSI); a Scheduling Request (SR) used for requesting a PUSCH (UpLink Shared CHannel (UL-SCH)) resource for initial transmission and a Hybrid Automatic Repeat reQuest ACKnowledgement (HARQ-ACK) for downlink data (a Transport block, a Medium Access Control Protocol Data Unit (MAC PDU), a DownLink-Shared CHannel (DL-SCH), or a Physical Downlink Shared CHannel (PDSCH)). The HARQ-ACK indicates an ACKnowledgement (ACK) or a Negative-ACKnowledgement (NACK).

The PUSCH is used to transmit uplink data (Uplink-Shared CHannel (UL-SCH)). The PUSCH is used to transmit a random access message 3. Furthermore, the PUSCH may be used to transmit the HARQ-ACK and/or channel state information with the uplink data not including the random access message 3. Furthermore, the PUSCH may be used to transmit only the channel state information or to transmit only the HARQ-ACK and the channel state information.

One of Quadrature Phase Shift Keying (QPSK), 16 Quadrature Amplitude Modulation (QAM), 64 QAM, and 256 QAM is applied to the PUSCH. The QPSK is a modulation scheme that transmits data by changing or adjusting the phase of a carrier wave. The QAM is a modulation scheme that transmits data by changing or adjusting the amplitude and the phase of an in-phase carrier wave and a quadrature carrier wave.

Figure 4:
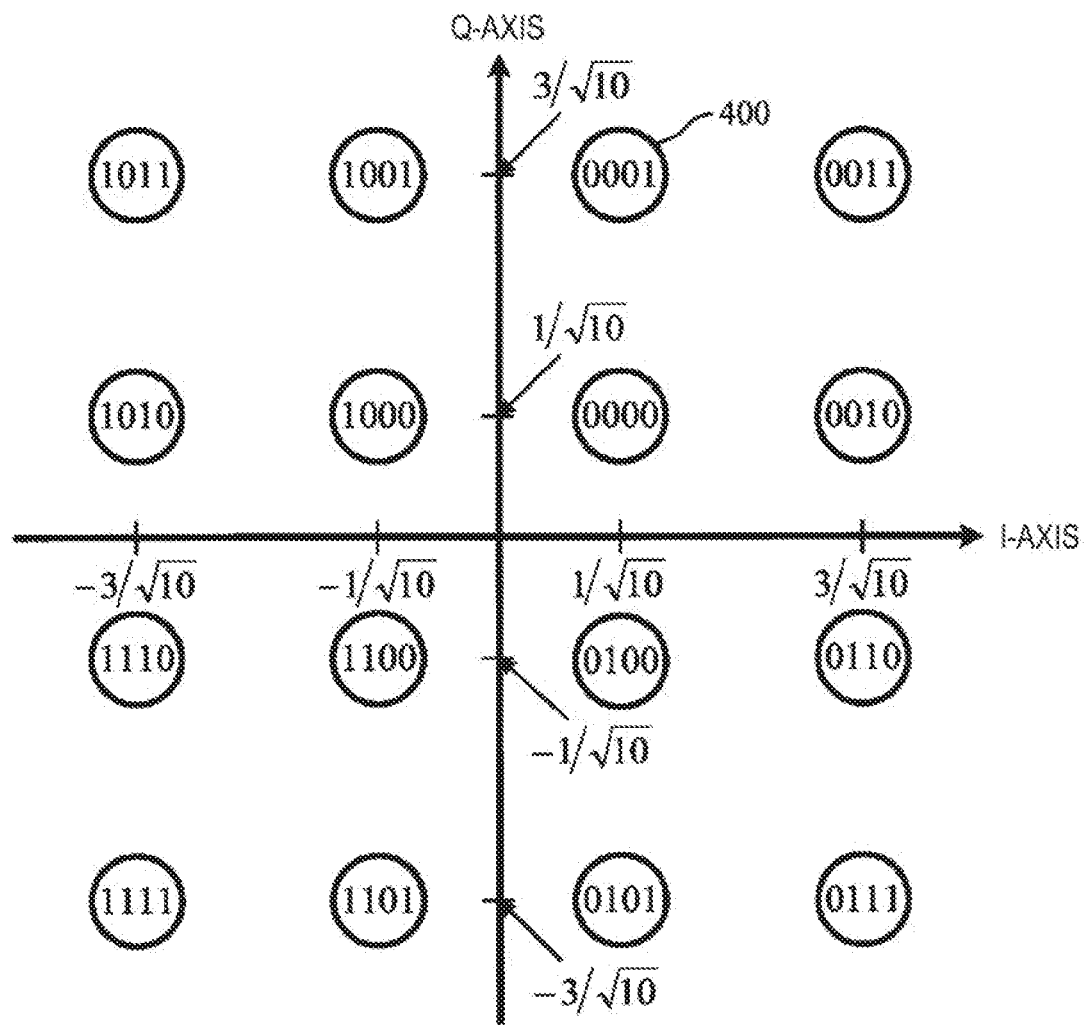
FIG. 4 is a diagram illustrating one example of a constellation of 16 QAM symbols according to the present embodiment.

The modulation order of QPSK is 2. The modulation order of 16 QAM is 4. The modulation order of 64 QAM is 6. The modulation order of 256 QAM is 8. A modulation order is the number of bits transmitted by one modulation symbol. FIG. 4 is a diagram illustrating one example of a constellation of 16 QAM symbols according to the present embodiment. In FIG. 4, a circle denoted by reference sign 400 is a signal point corresponding to 4 bits with a value of '0001'.

In the present embodiment, a symbol with a modulation order of 2 indicates a QPSK symbol, a symbol with a modulation order of 4 indicates 16 QAM, a symbol with a modulation order of 6 indicates a 64 QAM symbol, and a symbol with a modulation order of 8 indicates a 256 QAM symbol.

Specifically, in a case that the modulation order for the PUSCH is 2, QPSK is applied to the PUSCH. In a case that the modulation order for the PUSCH is 4, 16 QAM is applied to the PUSCH. In a case that the modulation order for the PUSCH is 6, 64 QAM is applied to the PUSCH. In a case that the modulation order for the PUSCH is 8, 256 QAM is applied to the PUSCH.

The PRACH is used to transmit a random access preamble (a random access message 1). The PRACH is used for the initial connection establishment procedure, the handover procedure, the connection re-establishment procedure, synchronization (timing adjustment) for uplink transmission, and the request for the PUSCH (UL-SCH) resource.

In FIG. 1, the following uplink physical signal is used in the uplink radio communication. The uplink physical signal is not used to transmit information output from a higher layer, but is used by the physical layer.

Uplink Reference Signal (UL RS)

According to the present embodiment, the following two types of uplink reference signals are used.

Demodulation Reference Signal (DMRS)

Sounding Reference Signal (SRS)

The DMRS is associated with transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both the PUSCH and the DMRS is hereinafter referred to simply as transmission of the PUSCH. Transmission of both the PUCCH and the DMRS is hereinafter referred to simply as transmission of the PUCCH.

The SRS has no association with the transmission or the PUSCH or the PUCCH. The base station device 3 may use the SRS for measurement of a channel state. The SRS is transmitted in the last SC-FDMA symbol in the uplink subframe or in the SC-FDMA symbol in UpPTS.

In FIG. 1, the following downlink physical channels are used for downlink radio communication from the base station device 3 to the terminal device 1. The downlink physical channel is used by the physical layer to transmit information output from a higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)
Physical Multicast CHannel (PMCH)

The PBCH is used to broadcast a Master Information Block (MIB) or a Broadcast CHannel (BCH), which is shared by the terminal devices 1.

The PCFICH is used to transmit information indicating a region (OFDM symbols) to be used for transmission of the PDCCH.

The PHICH is used to transmit a HARQ indicator (HARQ feedback or response information) indicating an ACKnowledgement (ACK) or a Negative ACKnowledgement (NACK) with respect to the uplink data (Uplink Shared CHannel (UL-SCH)) received by the base station device 3.

The PDCCH and the EPDCCH are used to transmit Downlink Control Information (DCI). The downlink control information is also referred to as a DCI format. The downlink control information includes a downlink grant and an uplink grant. The downlink grant is also referred to as downlink assignment or downlink allocation.

A single downlink grant is used for scheduling of a single PDSCH within a single cell. The downlink grant is used for scheduling of the PDSCH within the same subframe as the subframe in which the downlink grant is transmitted.

A single uplink grain is used for scheduling of a single PUSCH within a single serving cell. The uplink grant is used for scheduling of the PUSCH within the fourth or later subframe from the subframe in which the uplink grant is transmitted.

The uplink grant transmitted it the PDCCH includes a DCI format 0. The transmission scheme of the PUSCH corresponding to the DCI format 0 is single antenna port. The terminal device 1 uses the single antenna port transmission scheme for transmitting PUSCH corresponding to the DCI format 0. The PUSCH, to which the single antenna port transmission scheme is applied, is used in transmission of a single codeword (single transport block).

The uplink grant transmitted in the PDCCH includes a DCI format 4. The transmission scheme of the PUSCH corresponding to the DCI format 4 is closed loop spatial multiplexing. The terminal device 1 uses the closed loop spatial multiplexing transmission scheme for PUSCH transmission corresponding to the DCI format 4. The PUSCH to which the closed loop spatial multiplexing transmission scheme is applied is used in transmission of up to two codewords (up to two transport blocks).

CRC parity hits added to the downlink grant or the uplink grant are scrambled by a Cell-Radio Network Temporary Identifier (C-RNTI), a Temporary C-RNTI, or a Semi Persistent Scheduling Cell-Radio Network Temporary Identifier (SPS C-RNTI), The C-RNTI and the SPS C-RNTI are identifiers for identifying a terminal device within a cell. The Temporary C-RNTI is used during a contention based random access procedure.

The C-RNTI is used to control the PDSCH or the PUSCH in a single subframe. The SPS C-RNTI is used to periodically allocate a resource for the PDSCH or the PUSCH. The Temporary C-RNTI is used to schedule retransmission of the random access message 3 and transmission of a random access message 4.

The PDSCH is used to transmit downlink data (DownLink Shared CHannel (DL-SCH)). The PDSCH is used to transmit a random access message 2 (random access response).

The random access response includes a random access response grant. The random access response grant is an uplink grant transmitted on the PDSCH. The terminal device 1 uses the single antenna port transmission scheme for PUSCH transmission corresponding to the random access response grant and the PUSCH retransmission corresponding to the same transport block.

The PMCH is used to transmit multicast data (Multicast CHannel (MCH)).

In FIG. 1, the following downlink physical signals are used in the downlink radio communication. The downlink physical signals are not used to transmit information output from a higher layer, but are used by the physical layer.

Synchronization Signal (SS)

DownLink Reference Signal (DL RS)

The synchronization signal is used in order for the terminal device 1 to be synchronized in terms of frequency and time domains tsar downlink.

The downlink reference signal is used in order for the terminal device 1 to perform the channel compensation of the downlink physical channel. The downlink reference signal is used in order for the terminal device 1 to calculate the downlink channel state information.

According to the present embodiment, the following seven types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference signal (MBSFN RS)
Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in the Medium Access Control (MAC) layer is referred to as a transport channel. The unit of the transport channel used in the MAC layer is referred to as a Transport Block (TB) or a MAC Protocol Data Unit (PDU). Control of a Hybrid Automatic Repeat reQuest (HARQ) is performed for each transport block in the MAC layer. The transport block is a unit of data that the MAC layer delivers to the physical layer. In the physical layer, the transport block is mapped to a codeword, and coding processing is performed on a codeword-by-codeword basis.

The base station device 3 and the terminal device 1 communicate a signal in (transmit and receive a signal to and from) a higher layer. For example, in the Radio Resource Control (RRC) layer, the base station device 3 and the terminal device 1 may transmit and receive RRC signaling (also referred to as a Radio Resource Control message (RRC message) or Radio Resource Control information (RRC information)). Furthermore, in the Medium Access Control (MAC) layer, the base station device 3 and the terminal device 1 may transmit and receive a MAC Control Element (CE). Here, the RRC signaling and/or MAC CE is also referred to as higher layer signaling.

The PUSCH and the PDSCH are used to transmit the RRC signaling and the MAC CE. Here, the RRC signaling transmitted in the PDSCH from the base station device 3 may be signaling common to multiple terminal devices 1 within a cell. The RRC signaling transmitted on the PDSCH from the base station device 3 may be signaling dedicated to a certain terminal device 1 (also referred to as dedicated signaling or UE specific signaling). A cell specific parameter may be transmitted using signaling common to multiple terminal devices 1 within a cell or signaling dedicated to a certain terminal device 1. A UE specific parameter may be transmitted using signaling dedicated to a certain terminal device 1.

For each HARQ process, the terminal device 1 performs initial transmission or retransmission of the PUSCH, based on a New Data Indicator (NDI) included in the DCI format 0 along with the CRC parity bits scrambled by the C-RNTI and the DCI format 4 along with the CRC parity bits scrambled by the C-RNTI. The terminal device 1 performs the initial transmission of the PUSCH (transport block), based on the NDI being toggled. The terminal device 1 performs the retransmission of the PUSCH (transport block), based on the NDI not being toggled.

The terminal device 1 stores the received value of NDI for each HARQ process. The NDI being toggled indicates that the stored value of NDI is different from the received value of NDI. The NDI not being toggled indicates that the stored value of NDI and the received value of NDI are the same.

The random access response grant does not include the NDI. In a case that the random access response grant has been received, the terminal device 1 assumes that the NDI is toggled. Specifically, the terminal device 1 performs the initial transmission of the PUSCH (transport block), upon reception of the random access response grant.

In a case that the DCI format 0 along with the CRC parity bits scrambled by the Temporayr C-RNTI has been received, the terminal device 1 assumes that the NDI is not toggled. Specifically, the terminal device 1 performs the retransmission of the PUSCH (transport block, random access message 3), upon reception of the DCI format 0 along with the CRC parity bits scrambled by the Temporayr C-RNTI.

According to the present embodiment, the random access procedure may be performed in the primary cell and the secondary cell(s). The PRACH may be transmitted in the primary cell and the secondary cell(s). The terminal device 1 receives, from the base station device 3, information (RRC message) relating to the random access procedure in the primary cell. The information relating to the random access procedure in the primary cell may include information indicating a set of PRACH resources in the primary cell.

The PRACH may be transmitted in the secondary cell(s). The terminal device 1 receives, from the base station device 3, information (RRC message) relating to the random access procedure in the secondary cell(s). The information relating to the random access procedure in the secondary cell(s) may include information indicating a set of PRACH resources in the secondary cell(s).

The random access procedure includes the contention based random access procedure and a non-contention based random access procedure. In the primary cell, the contention based random access procedure and the non-contention based random access procedure are supported. In the secondary cell(s), the non-contention based random access procedure is supported. In the secondary cell(s), the non-contention based random access procedure is not supported.

The retransmission of the transport block (random access message 3) transmitted in the PUSCH corresponding to the random access response for the non-contention based random access procedure is controlled by the DCI format 0 along with the CRC parity bits scrambled by the Temporary C-RNTI.

The retransmission of the transport block transmitted on the PUSCH corresponding to the random access response for the contention based random access procedure is controlled by the DCI format 0 along with the CRC parity bits scrambled by the C-RNTI.

Specifically, the PUSCH transmission corresponding to the DCI format 0 along with the CRC parity bits scrambled by the C-RNTI is not PUSCH transmission corresponding to the random access response grant in the non-contention based random access procedure or retransmission of the same transport.

Specifically, the PUSCH transmission corresponding to the DCI format 0 along with the CRC parity bits scrambled by the Temporary C-RNTI is retransmission of the same transport as the transport block transmitted on the PUSCH corresponding to the random access response grant in the non-contention based random access procedure.

FIG. 5 is a diagram illustrating one example of information included in the uplink grant according to the present embodiment. A DCI format 0 (500) includes at least (a) a 'Resource block assignment and hopping resource allocation' field, (b) a 'Modulation and coding scheme and redundancy version' field, and (c) a 'New data indicator' field.

A DCI format 4 (502) includes at least (d) a 'Resource block assignment' field, (e) a 'Modulation and coding scheme and redundancy version' field for transport block 1, (f) a 'New data indicator' field for transport block 1, (g) a 'Modulation and coding scheme and redundancy version' field for transport block 2, and (h) a 'New data indicator' field for transport block 2.

The random access response grant (504) includes at least (i) a 'Fixed size resource block assignment' field and (j) a 'Truncated modulation and coding scheme' field.

Figure 6:
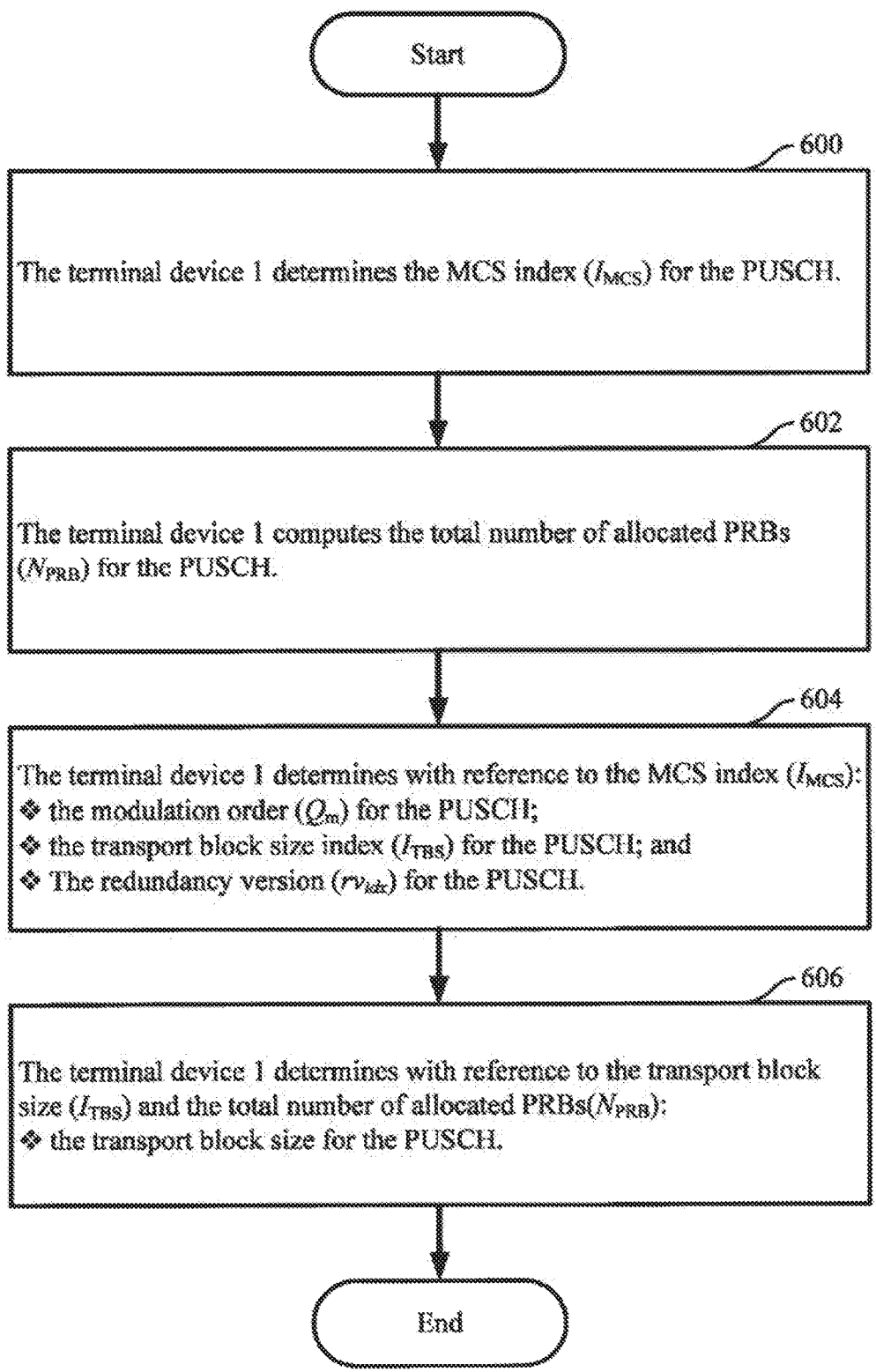
FIG. 6 is a diagram illustrating one example of a method of acquiring scheduling information for a PUSCH according to the present embodiment.

FIG. 6 is a diagram illustrating one example of a method of acquiring scheduling information for the PUSCH according to the present embodiment. Here, the scheduling information includes the total number of allocated physical resource blocks ($N_{PRB}$), a modulation order ($Q_m$), a redundancy version ($rv_{idx}$), and a transport block size. The redundancy version ($rv_{idx}$) is used for coding (rate matching) of the transport block transmitted on the PUSCH. The transport block size is the number of bits of the transport block.

The terminal device 1 performs processing of FIG. 6 for each serving cell and for each PUSCH.

(600) The terminal device 1 determines an MCS index ($I_{MCS}$) for the PUSCH, based on (b) the 'Modulation and coding scheme and redundancy version' field, (e) the 'Modulation and coding scheme and redundancy version' field for transport block 1, (g) the 'Modulation and coding scheme and redundancy version' field for transport block 2, or (j) the 'Truncated modulation and coding scheme' field.

(602) The terminal device 1 calculates the total number of physical resource blocks ($N_{PRB}$) allocated to the PUSCH, based on (a) the 'Resource block assignment and hopping, resource allocation' field, (d) the 'Resource block assignment' field, or (i) the 'Fixed size resource block assignment' field.

(604) The terminal device 1 determines the modulation order ($Q_m$) for the PUSCH, a transport block size index ($I_{TBS}$) for the PUSCH, and the redundancy version ($rv_{idx}$) for the PUSCH, by referring to the MCS index ($I_{MCS}$) for the PUSCH determined in 600.

(606) The terminal device 1 determines a transport block size (TBS) for the PUSCH, by referring to the total number of physical resource blocks ($N_{PRB}$) allocated to the PUSCH calculated in 602 and the MCS index ($I_{MCS}$) for the PUSCH that has been determined in 604.

FIG. 7 and FIG. 8 are diagrams illustrating correspondence tables of the MCS index ($I_{MCS}$), ($Q'_m$), the transport block size index ($I_{TBS}$), and the redundancy version ($rv_{idx}$) according to the present embodiment. Depending on the situation, the terminal device 1 and the base station device 3 use one of the correspondence table indicated by FIG. 7 and the correspondence table indicated by FIG. 8. Here, $Q'_m$ is used to determine the modulation order ($Q_m$).

The correspondence of the MCS index ($I_{MCS}$) and the redundancy version ($rv_{idx}$) in the correspondence table of FIG. 7 is the same with the correspondence of the MCS index ($I_{MCS}$) and the redundancy version ($rv_{idx}$) in the correspondence table of FIG. 8.

In FIG. 7, in a case that the value of the MCS index ($I_{MCS}$) is 0, ($Q'_m$) is 8, the transport block size index ($I_{TBS}$) is 33, and the redundancy version ($rv_{idx}$) is 0. In FIG. 7 and FIG. 8, in a case that the value of the MCS index ($I_{MCS}$) is 29, 30, or 31, ($Q'_m$) and the transport block size index ($I_{TBS}$) are reserved. The MCS indexes ($I_{MCS}$) of 29, 30, and 31 are used for the retransmission of the PUSCH.

The terminal device 1 uses one of the correspondence table of FIG. 7 and the correspondence table of FIG. 8, based on some or all of the following conditions.

Condition (1): Whether a higher layer parameter enable256QAM is configured for the serving cell.

Condition (2): Whether a higher layer parameter enable64QAM is configured for the serving cell.

Condition (3): Type of the most recent uplink grant (such as the DCI format 0, the DCI format 4, or the random access response grant) used for scheduling of the same transport block.

Condition (4): Type of an RNTI (such as the C-RNTI or the Temporary C-RNTI) used for the most recent uplink grant used for scheduling of the same transport block.

Condition (5): Whether the initial PUSCH transmission for the same transport block has been scheduled by the random access response grant.

Here, the base station device 3 may transmit the RRC message including the higher layer parameter enable256QAM for the serving cell to the terminal device 1. The terminal device 1 may configure the higher layer parameter enable256QAM for the serving cell, based on the RRC message. The higher layer parameter enable256QAM indicates that 256 QAM for the PUSCH is allowed.

Here, the base station device 3 may transmit the RRC message including the higher layer parameter enable64QAM for the serving cell to the terminal device 1. The terminal device 1 may configure the higher layer parameter enable64QAM for the serving cell, based on the RRC message. The higher layer parameter enable64QAM indicates that 64 QAM for the PUSCH is allowed.

The base station device 3 may cause the terminal device 1 to be always configured with the higher layer parameter enable64QAM, in a case that the terminal device 1 is configured with the higher layer parameter enable256QAM. In a case that the higher layer parameter enable256QAM is configured, the terminal device 1 may ignore or release the higher layer parameter enable64QAM.

FIG. 9 is a diagram illustrating the correspondence of the total number of allocated physical resource blocks ($N_{PRB}$), the transport block size index ($I_{TBS}$), and the transport block size according to the present embodiment. In FIG. 9, the transport block size is 16, in a case that the total number of physical resource blocks ($N_{PRB}$) allocated to the PUSCH is 1 and the transport block size index ($I_{TBS}$) for the PUSCH is 0.

FIG. 10 is a diagram illustrating a pseudo-code (1000) for determining the transport block size index ($I_{TBS}$) for the transport block in the PUSCH with respect to the MCS index ($I_{MCS}$) of 0 to 28 according to the present embodiment.

The DCI format 4 may be included in a first DCI format. The DCI format 0 may be included in one of a first DCI format and a second DCI format.

(1001) If the higher layer parameter enable256QAM is configured for the serving cell, and if the PUSCH is scheduled by a PDCCH/EPDCCH with the first DCI format along with the CRC parity bits scrambled by the C-RNTI and if the initial PUSCH transmission for the same transport block is not scheduled by the random access response grant, (1002) the transport block size index ($I_{TBS}$) for the PUSCH is given by using the MCS index ($I_{MCS}$) and the correspondence table indicated by FIG. 7.

In a case that the condition of (1001) is not satisfied, (1008) the transport block size index ($I_{TBS}$) for the PUSCH is given by using the MCS index ($I_{MCS}$) and the correspondence table indicated by FIG. 8.

(1003) If the higher layer parameter enable256QAM is configured for the serving cell, and if the PUSCH is scheduled by a PDCCH/EPDCCH with the first DCI format along with the CRC parity bits scrambled by the C-RNTI and if the initial PUSCH transmission for the same transport block is scheduled by the random access response grant, (1008) the transport block size index ($I_{TBS}$) for the PUSCH is given by using the MCS index ($I_{MCS}$) and the correspondence table indicated by FIG. 8.

(1004) If the higher layer parameter enable256QAM is configured for the serving cell, and if the PUSCH is scheduled by a PDCCH/EPDCCH with the second DCI format along with the CRC parity bits scrambled by the C-RNTI, (1008) the transport block size index ($I_{TBS}$) for the PUSCH is given by using the MCS index ($I_{MCS}$) and the correspondence table indicated by FIG. 8.

(1005) If the higher layer parameter enable256QAM is configured for the serving cell, and if the PUSCH is scheduled by a PDCCH/EPDCCH with the first or second DCI format along with the CRC parity bits scrambled by an RNTI other than the C-RNTI, (1008) the transport block size index ($I_{TBS}$) for the PUSCH is given by using the MCS index ($I_{MCS}$) and the correspondence table indicated by FIG. 8. Here, the RNTI other than the C-RNTI may include the SPS C-RNTI and/or the Temporary C-RNTI.

(1006) If the higher layer parameter enable256QAM is configured for the serving cell, and if the PUSCH is scheduled by a random access response grant, (1008) the transport block size index ($I_{TBS}$) for the PUSCH is given by using the MCS index ($I_{MCS}$) and the correspondence table indicated by FIG. 8.

(1007) If the higher layer parameter enable256QAM is not configured for the serving cell, (1008) the transport block size index ($I_{TBS}$) for the PUSCH is given by using the MCS index ($I_{MCS}$) and the correspondence table indicated by FIG. 8.

FIG. 11 is a diagram illustrating a pseudo-code (1100) for determining the transport block size ($I_{TBS}$) for the transport block in the PUSCH with respect to the MCS index ($I_{MCS}$) of 29 to 31 according to the present embodiment.

(1101) If there is a PDCCH/EPDCCH with the first or second DCI format for the same transport block using the MCS index ($I_{MCS}$) of 0 to 28, the TBS index ($I_{TBS}$) is determined from the downlink control information transported in the latest (last) PDCCH/EPDCCH with the first or second DCI format for the same transport block using the MCS index ($I_{MCS}$) of 0 to 28, according to (1002) or (1008) in FIG. 10. Here, the downlink control information is (b), (e), or (g) in FIG. 5.

(1102) If there is no PDCCH/EPDCCH with the first or second DCI format for the same transport block using the MCS index ($I_{MCS}$) of 0 to 28, and (1103) if the initial PUSCH transmission for the same transport block is semi-persistently scheduled, the TBS index ($I_{TBS}$) is determined from the most recent semi-persistent scheduling assignment PDCCH/EPDCCH according to (1008) in FIG. 10. Here, the semi-persistent scheduling assignment PDCCH/EPDCCH is a PDCCH/EPDCCH with the first or second DCI format along with the CRC parity bits scrambled by the SPS C-RNTI.

(1102) If there is no PDCCH/EPDCCH with the first or second DCI format for the same transport block using the MCS index ($I_{MCS}$) of 0 to 28, and (1104) if the transmission of the PUSCH (transport block) is initiated by the random access response grant, the TBS index ($I_{TBS}$) is determined from the random access response grant for the same transport block according to (1008) in FIG. 10.

FIG. 12 is a diagram illustrating a pseudo-code (1200) for determining the modulation order ($Q_m$) for the PUSCH with respect to the MCS index ($I_{MCS}$) of 0 to 28 according to the present embodiment.

The first DCI format in FIG. 12 is the same with the first DCI format in FIG. 10. The second DCI format in FIG. 12 is the same with the second DCI format in FIG. 10. A DCI format 4 may be included in the first DCI format. A DCI format 0 may be included in one of the first DCI format and the second DCI format.

(1201) If the higher layer parameter enable256QAM is configured for the serving cell, and if the PUSCH is scheduled by a PDCCH/EPDCCH with the first DCI format along with the CRC parity bits scrambled by the C-RNTI and if the initial PUSCH transmission for the same transport block is not scheduled by the random access response grant, (1202) $Q'_m$ is first read from the correspondence table indicated by FIG. 7 based on the MCS index ($I_{MCS}$), and the modulation order ($Q_m$) for the PUSCH is set to $Q_m = Q'_m$. Here, (1201) in FIG. 12 is the same with (1001) in FIG. 10.

In a case that the condition of (1201) is not satisfied, (1208 or 1210) $Q'_m$ is first read from the correspondence table indicated by FIG. 8 based on the MCS index ($I_{MCS}$), and the modulation order ($Q_m$) for the PUSCH is set to $Q_m = Q'_m$ or $Q_m = \min(4, Q'_m)$. Here, min is a function that outputs the smallest value out of multiple values inside brackets.

(1203) If the higher layer parameter enable256QAM is configured for the serving cell, and if the PUSCH is scheduled by a PDCCH/EPDCCH with the first DCI format along with the CRC parity bits scrambled by the C-RNTI and if the initial PUSCH transmission for the same transport block is scheduled by the random access response grant, (1208) $Q'_m$ is first read from the correspondence table indicated by FIG. 8 based on the MCS index ($I_{MCS}$), and the modulation order ($Q_m$) for the PUSCH is set to $Q_m = Q'_m$. Here, (1203) in FIG. 12 is the same with (1003) in FIG. 10.

(1204) If the higher layer parameter enable256QAM is configured for the serving cell, and if the PUSCH is scheduled by a PDCCH/EPDCCH with the second DCI format along with the CRC parity bits scrambled by the C-RNTI, (1208) $Q'_m$ is first read from the correspondence table indicated by FIG. 8 based on the MCS index ($I_{MCS}$), and the modulation order ($Q_m$) for the PUSCH is set to $Q_m = Q'_m$. Here, (1204) in FIG. 12 is the same with (1004) in FIG. 10.

(1205) If the higher layer parameter enable256QAM is configured for the serving cell, and if the PUSCH is scheduled by a PDCCH/EPDCCH with the first or second DCI format along with the CRC parity bits scrambled by an RNTI other than the C-RNTI, (1208) $Q'_m$ is first read from the correspondence table indicated by FIG. 8 based on the MCS index ($I_{MCS}$), and the modulation order ($Q_m$) for the PUSCH is set to $Q_m = Q'_m$. Here, the RNTI other than the C-RNTI may include the SPS C-RNTI and/or the Temporary C-RNTI. Here, (1205) in FIG. 12 is the same with (1005) in FIG. 10.

(1206) If the higher layer parameter enable256QAM is configured for the serving cell, and if the PUSCH is scheduled by a random access response grant, (1208) $Q'_m$ is first read from the correspondence table indicated by FIG. 8 based on the MCS index ($I_{MCS}$), and the modulation order ($Q_m$) for the PUSCH is set to $Q_m = Q'_m$. Here, (1206) in FIG. 12 is the same with (1006) in FIG. 10.

(1207) If the higher layer parameter enable256QAM is not configured for the serving cell and the higher layer parameter enable64QAM is configured for the serving cell, (1208) $Q'_m$ is first read from the correspondence table indicated by FIG. 8 based on the MCS index ($I_{MCS}$), and the modulation order ($Q_m$) for the PUSCH is set to $Q_m=Q'_m$.

(1209) If the higher layer parameter enahle256QAM and the higher layer parameter enable64QAM are not configured for the serving cell, (1210) $Q'_m$ is first read from the correspondence table indicated by FIG. 8 based on the MCS index ($I_{MCS}$), and the modulation order ($Q_m$) for the PUSCH is set to $Q_m=\min(4, Q'_m)$.

FIG. 13 is a diagram illustrating a pseudo-code (1300) for determining the modulation order ($Q_m$) for the PUSCH with respect to the MCS index ($I_{MCS}$) of 29 to 31 according to the present embodiment.

(1301) If there is a PDCCH/EPDCCH with the first or second DCI format for the same transport block using the MCS index ($I_{MCS}$) of 0 to 28, the modulation order ($Q_m$) for the PUSCH is determined from the downlink control information transported in the latest (last) PDCCH/EPDCCH with the first or second DCI format for the same transport block using the MCS index ($I_{MCS}$) of 0 to 28, according to (1202), (1208), or (1210) in FIG. 12. Here, the downlink control information is (b), (e), or (g) in FIG. 5.

(1302) If there is no PDCCH/EPDCCH with the first or second DCI format for the same transport block using the MCS index ($I_{MCS}$) of 0 to 28, and (1303) if the initial PUSCH transmission for the same transport block is semi-persistently scheduled, the modulation order ($Q_m$) for the PUSCH is determined from the most recent semi-persistent scheduling assignment PDCCH/EPDCCH according to (1208) or (1210) in FIG. 12. Here, the semi-persistent scheduling assignment PDCCH/EPDCCH is a PDCCH/EPDCCH with the first or second DCI format along with the CRC parity bits scrambled by the SPS C-RNTI.

(1302) If there is no PDCCH/EPDCCH with the first or second DCI format for the same transport block using the MCS index ($I_{MCS}$) of 0 to 28, and (1304) if the transmission of the PUSCH (transport block) is initiated by the random access response grant, the modulation order ($Q_m$) for the PUSCH is determined from the random access response grant for the same transport block according to (1208) or (1210) in FIG. 12.

FIG. 14 is a diagram illustrating a pseudo-code (1400) for determining the redundancy version ($rv_{idx}$) for the PUSCH according to the present embodiment.

(1401) In a case that the MCS index ($I_{MCS}$) is 0 to 28, the redundancy version ($rv_{idx}$) is 0. (1402) In a case that the MCS index ($I_{MCS}$) is 29, the redundancy version ($rv_{idx}$) is 1. (1403) In a case that the MCS index ($I_{MCS}$) is 30, the redundancy version ($rv_{idx}$) is 2. (1404) In a case that the MCS index ($I_{MCS}$) is 31, the redundancy version ($rv_{idx}$) is 3.

The correspondence of the MCS index ($I_{MCS}$) and the redundancy version ($rv_{idx}$) in the correspondence table of FIG. 7 is the same as the correspondence of the MCS index ($I_{MCS}$) and the redundancy version ($rv_{idx}$) in the correspondence table or FIG. 8.

A configuration of devices according to the present embodiment will be described below.

Figure 15:
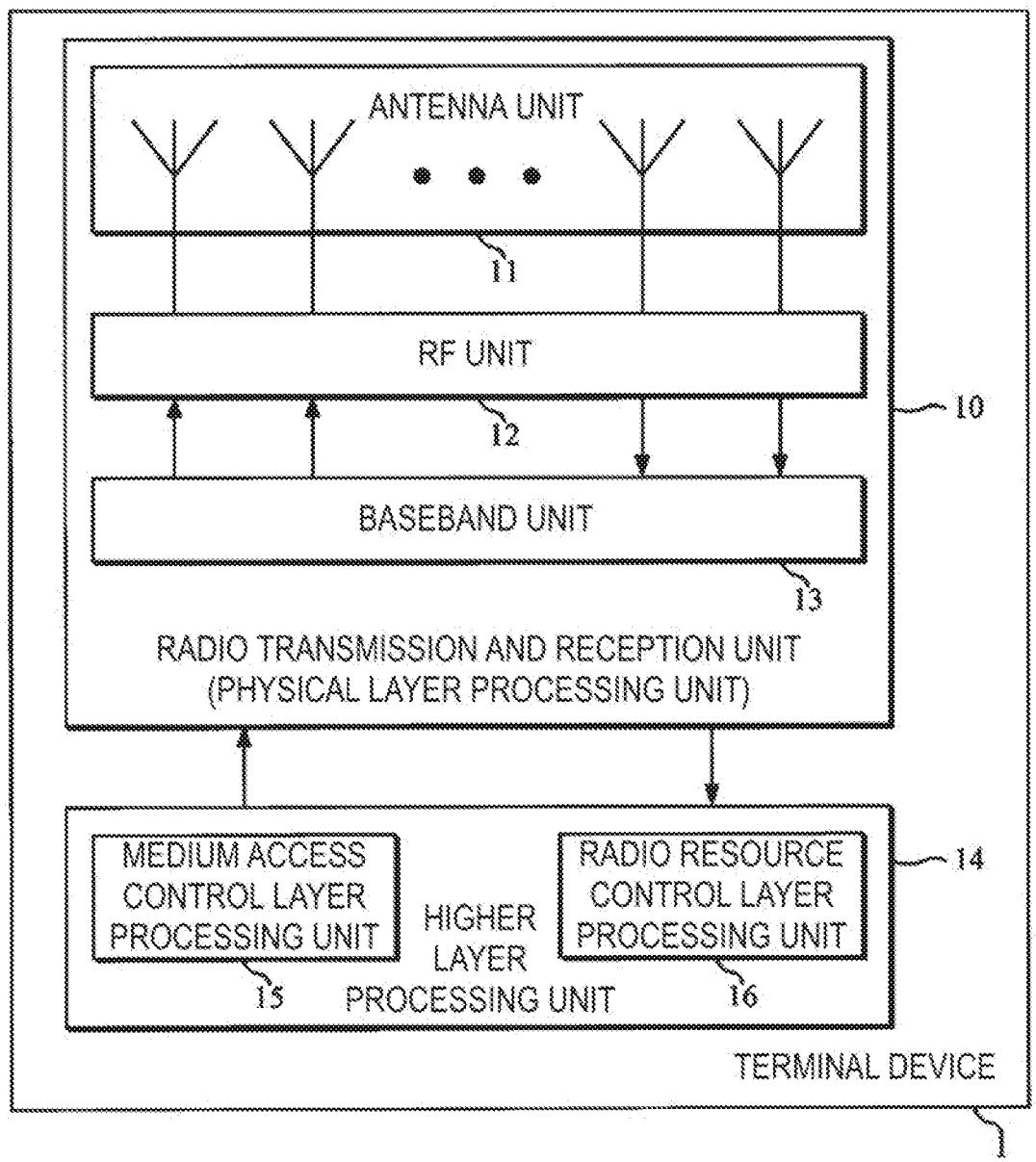
FIG. 15 is a schematic block diagram illustrating a configuration of a terminal device 1 according to the present embodiment.

FIG. 15 is a schematic block diagram illustrating a configuration of the terminal device 1 according to the present embodiment. As illustrated in FIG. 15, the terminal device 1 is configured to include a radio transmission and reception unit 10 and a higher layer processing unit 14. The radio transmission and reception unit 10 is configured to include an antenna unit 11, a radio frequency (RF) unit 12, and a baseband unit 13. The higher layer processing unit 14 is configured to include a medium access control layer processing unit 15 and a radio resource control layer processing unit 16. The radio transmission and reception unit 10 is also referred to as a transmission unit, a reception unit, or a physical layer processing unit.

The higher layer processing unit 14 outputs uplink data (transport block) generated by a user operation or the like, to the radio transmission and reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the medium access control layer. The medium access control layer processing unit 15 controls transmission of the scheduling request, based on various configuration information/parameters managed by the radio resource control layer processing unit 16.

The radio resource control layer processing unit 16 included in the higher layer processing unit 14 performs processing of the radio resource control layer. The radio resource control layer processing unit 16 manages various configuration information/parameters of the terminal device 1 itself. The radio resource control layer processing unit 16 sets the various configuration information/parameters the higher layer signaling received from the base station device 3. Specifically, the radio resource control layer processing unit 16 sets the various configuration information/parameters in accordance with information indicating the various configuration information/parameters received from the base station device 3.

The radio transmission and reception unit 10 performs processing of the physical layer, such as modulation, demodulation, coding, and decoding. The radio transmission and reception unit 10 demultiplexes, demodulates, and decodes a signal received from the base station device 3, and outputs the information resulting from the decoding to the higher layer processing unit 14. The radio transmission and reception unit 10 modulates and codes data to generate a transmit signal, and transmits the transmit signal to the base station device 3.

The RF unit 12 converts (down converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal input from the RE unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier transform (IFFT) on data, generates an SC-FDMA symbol, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. Furthermore, the RF unit 12 amplifies power. Furthermore, the RF unit 12 may include a function of controlling transmit power. The RF unit 12 is also referred to as a transmit power control unit.

Figure 16:
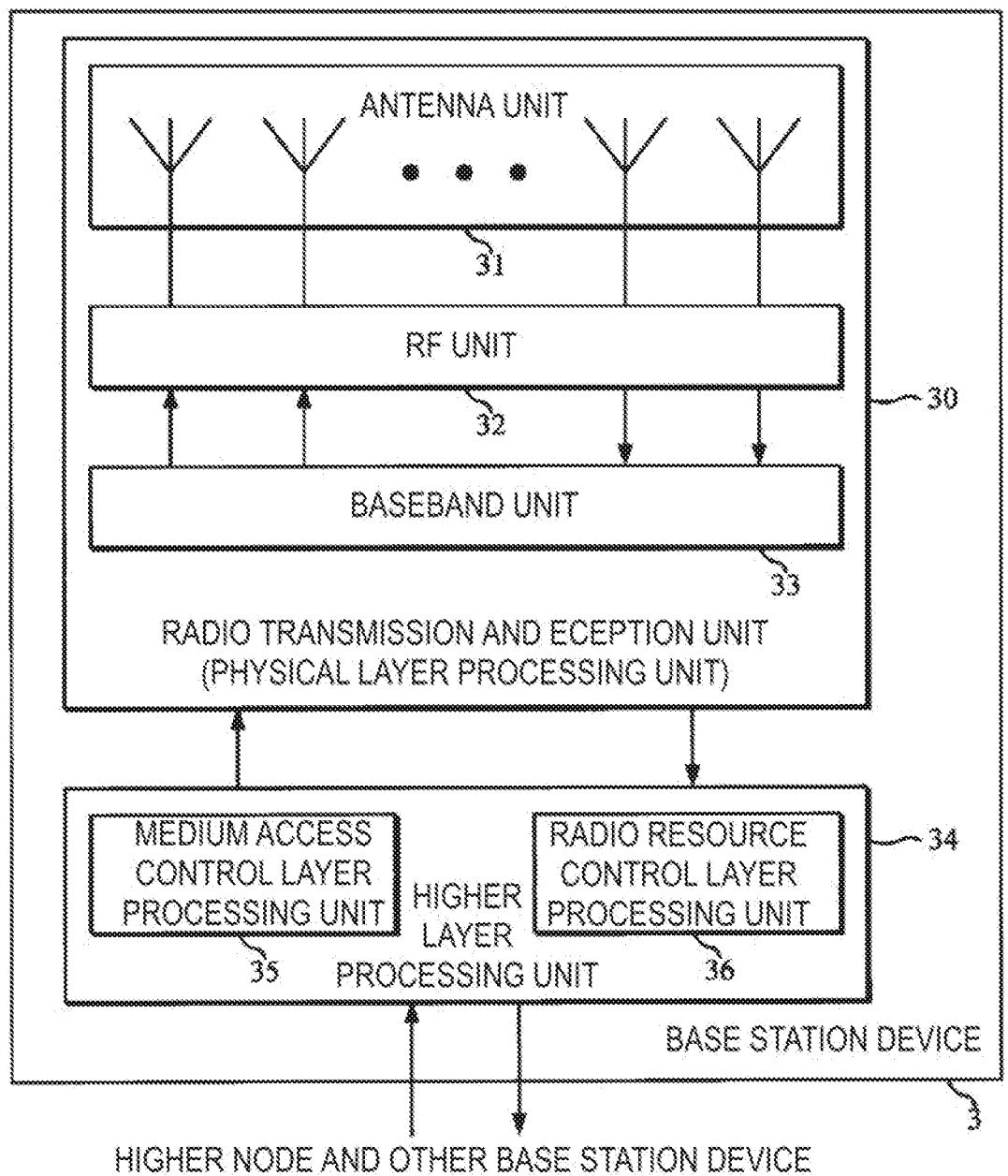
FIG. 16 is a schematic block diagram illustrating a configuration of a base station device 3 according to the present embodiment.

FIG. 16 is a schematic block diagram illustrating a configuration of the base station device 3 according to the present embodiment. As illustrated in FIG. 16, the base station device 3 is configured to include a radio transmission and reception unit 30 and a higher layer processing unit 34. The radio transmission and reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and reception unit 30 is also referred to as a transmission unit, a reception unit, or a physical layer processing unit.

The higher layer processing unit 34 performs processing or the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the medium access control layer. The medium access control layer processing unit 35 performs processing relating to the scheduling request based on various configuration information/parameters managed by the radio resource control layer processing unit 36.

The radio resource control layer processing unit 36 included in the higher layer processing unit 34 performs the processing of the radio resource control layer. The radio resource control layer processing unit 36 generates, or acquires from a higher node, downlink data (transport block) arranged on the physical downlink shared channel, system information, the RRC message, the MAC Control Element (CE), and the like, and outputs the generated or acquired data to the radio transmission and reception unit 30. Furthermore, the radio resource control layer processing unit 36 manages various configuration information/parameters for each of the terminal devices 1. The radio resource control layer processing unit 36 may set various configuration information/parameters for each of the terminal devices 1 via the higher layer signaling. Specifically, the radio resource control layer processing unit 36 transmits/broadcasts information indicating various configuration information/parameters.

The functionality of the radio transmission and reception unit 30 is similar to that of the radio transmission and reception unit 10, and hence description thereof is omitted.

Each of the units denoted by reference sign 10 to reference sign 16 included in the terminal device 1 may be configured as a circuit. Each of the units denoted by reference sign 30 to reference sign 36 included in the base station device 3 may be configured as a circuit.

Various aspects of the terminal device 1 and the base station device 3 according to the present embodiment will be described below.

(1) A first aspect of the present embodiment is the terminal device 1 including: the reception unit 10 configured to receive a control channel (PDCCH) including first control information (DCI format); and the transmission unit 10 configured to transmit a transport block on a first shared channel (PUSCH) upon detection of the control channel including the first control information. For the first control information along with a CRC parity bit scrambled by a first identifier (C-RNTI), a size of the transport block is given using a first information field included in the first control information along with the CRC parity bit scrambled by the first identifier, based on whether a second shared channel (PUSCH) for initial transmission of a transport block identical to the transport block corresponding to the first control information is scheduled by a random access response grant.

(2) In the first aspect of the present embodiment, for the first control information along with the CRC parity bit scrambled by the first identifier, a modulation order for the first shared channel is given using the first information field included in the first control information along with the CRC parity bit scrambled by the first identifier, based on whether the second shared channel is scheduled by the random access response grant.

(3) In the first aspect of the present embodiment, for the first control information along with CRC parity bit scrambled by a second identifier (SPS C-RNTI), the size of the transport block is given using the first information field included in the first control information along with the CRC parity bit scrambled by the second identifier, regardless of whether the second shared channel is scheduled by the random access response grant.

(4) In the first aspect of the present embodiment, for the first control information along with the CRC parity bit scrambled by the second identifier, a modulation order for the first shared channel is given using the first information field included in the first control information along with the CRC parity bit scrambled by the second identifier, regardless of whether the second shared channel has been scheduled by the random access response grant.

(5) in the first aspect of the present embodiment, the reception unit 10 is configured to receive a third shared channel (PDSCH) including second control information (random access response grant), the transmission unit 10 is configured to transmit a transport block on a fourth shared channel (PUSCH) based on the second control information, and the size of the transport block is given based on which one of the first control information included in the control channel and the second control information included in the third shared channel is used to schedule transmission of the transport block.

(6) A second aspect of the present embodiment is the base station device 3 including: the transmission unit 10 configured to transmit a control channel (PDCCH) including first control information (DCI format); and the reception unit 10 configured to receive a transport block on a first shared channel based on transmission of the control channel including the first control information. For the first control information along with a CRC parity bit scrambled by a first identifier (C-RNTI), a size of the transport block is given using a first information field included in the first control information along with the CRC parity bit scrambled by the first identifier, based on whether a second shared channel (PUSCH) for initial transmission of a transport block identical to the transport block corresponding to the first control information is scheduled by a random access response grant.

(7) In the second aspect of the present embodiment, for the first control information along with the CRC parity bit scrambled by the first identifier, a modulation order for the first shared channel is given using the first information field included in the first control information along with the CRC parity bit scrambled by the first identifier, based on whether the second shared channel is scheduled by the random access response grant.

(8) In the second aspect of the present embodiment, for the first control information along with CRC parity bit scrambled by a second identifier (SPS C-RNTI), the size of the transport block is given using the first information field included in the first control information along with the CRC parity bit scrambled by the second identifier, regardless of whether the second shared channel is scheduled by the random access response grant.

(9) In the second aspect of the present embodiment, for the first control information along with the CRC parity bit scrambled by the second identifier, a modulation order for the first shared channel is given using the first information field included in the first control information along with the CRC parity bit scrambled by the second identifier, regardless of whether the second shared channel is scheduled by the random access response grant.

(10) In the second aspect of the present embodiment, the transmission unit 10 configured to transmit a third shared channel including second control information random access response), the reception unit 10 configured to receive a transport block on a fourth shared channel (PUSCH) based on the second control information, and the size of the transport block is given based on which one of the first control information included in the control channel and the second control information included in the third shared channel is used to schedule transmission of the transport block.

Accordingly, the terminal device and the base station device can communicate with each other efficiently using an uplink channel.

The base station device 3 according to the present invention can be realized as an aggregation (a device group) constituted of multiple devices. Each of devices constituting the device group may be equipped with some or all portions of each function or each functional block of the base station device 3 according to the above-described embodiment. It is only required that the device group itself include general functions or general functional blocks of the base station device 3. Furthermore, the terminal device 1 according to the above-described embodiment can also communicate with the base station device as the aggregation.

Furthermore, the base station device 3 according to the above-described embodiment may be an Evolved Universal Terrestrial Radio Access Network (EUTRAN). Furthermore, the base station device 3 according to the above-described embodiment may have some or all portions of the function of a node higher than an eNodeB.

A program running on the device according to the present invention may be a program that controls a Central Processing Unit (CPU) and the like to cause a computer to operate, in such a manner as to realize the functions according to the above-described embodiment of the present invention. The program or information handled by the program is temporarily read into a volatile memory such as a Random Access Memory (RAM) at the time of processing, or stored in a non-volatile memory such as a flash memory or in a Hard Disk Drive (HDD) to be read, modified, or written by the CPU as necessary.

Moreover, the device according to the above-described embodiment may be partially realized by the computer. This configuration may be realized by recording a program for realizing such control functions on a computer-readable recording medium and causing a computer system to read the program recorded on the recording medium for execution. The "computer system" herein refers to a computer system built into the device, and the computer system includes an operating system and hardware components such as a peripheral device. Furthermore, the "computer-readable recording medium" may be any one of a semiconductor recording medium, an optical recording medium, a magnetic recording medium, and the like.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, each functional block or various features of the devices used in the above-described embodiment may be mounted or implemented on an electrical circuit, i.e., typically an integrated circuit or multiple integrated circuits. An electrical circuit designed to implement the functionality described herein may include a general-purpose processor, a digital signal pressure (DSP), an application specific integrated circuit (ASIC), a field programmable gate array (FPGA) or other programmable logic devices, a discrete late or transistor logic, a discrete hardware component, or a combination thereof. The general-purpose processor may be a microprocessor, but in the alternative, the processor may be any conventional processor, controller, microcontroller, or state machine. The general-purpose processor or each circuit described above may be configured of a digital circuit or may be configured of an analog circuit. Furthermore, if with advances in semiconductor technology, a circuit integration technology with which current integrated circuits are replaced appears, it is also possible to use an integrated circuit based on the technology.

Moreover, the present invention is not limited to above-described embodiment. According to the embodiment, one example of the devices has been described, but the present invention is not limited to this, and can be applied to a fixed-type or a stationary-type electronic apparatus installed indoors or outdoors, for example, a terminal device or a communication device, such as an audio-video (AV) apparatus, a kitchen apparatus, a cleaning or washing machine, an air-conditioning apparatus, office equipment, a vending machine, and other household apparatuses.

Embodiments of the present invention have been described in detail above referring to the drawings, but the specific configuration is not limited to the embodiment and includes, for example, an amendment to a design that fails within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

DESCRIPTION OF REFERENCE NUMERALS 1 (1A, 1B, 1C) Terminal device
3 Base station device
10 Radio transmission and reception unit
11 Antenna unit
12 RF unit
13 Baseband unit
14 Higher layer processing unit
15 Medium access control layer processing unit 16 Radio resource control layer processing unit
30 Radio transmission and reception unit
31 Antenna unit
32 RF unit
33 Baseband unit
34 Higher layer processing unit
35 Medium access control layer processing unit
36 Radio resource control layer processing unit

The invention claimed is:

1. A terminal device comprising:
reception circuitry configured to and/or programmed to:
detect a physical downlink control channel (PDCCH), the PDCCH including downlink control information (DCI) that is used for a scheduling of a first physical uplink shared channel (PUSCH);
receive a higher layer parameter; and
receive a random access response, the random access response including an uplink grant; and
transmission circuitry configured to and/or programmed to:
transmit the first PUSCH according to the PDCCH with the DCI; and
transmit a second PUSCH according to the uplink grant, wherein
the DCI includes a first "modulation and coding scheme" index,
the uplink grant includes a second "modulation and coding scheme" index,
a first modulation order Qm for the first PUSCH is given based on a first index Q'm in a first table, the first index Q'm corresponding to the first "modulation and coding scheme" index based on the first table, in a case that the higher layer parameter indicating that 256 QAM is allowed is configured,
the first modulation order Qm for the first PUSCH is given based on a second index Q'm in a second table being different from the first table, the second index Q'm corresponding to the first "modulation and coding scheme" index based on the second table, in a case that the higher layer parameter indicating that 256 QAM is allowed is not configured, and
a second modulation order Qm for the second PUSCH is given, regardless of whether the higher layer parameter indicating that 256 QAM is allowed is configured, based on a third index Q'm in the second table, the third index Q'm corresponding to the second "modulation and coding scheme" index based on the second table.

2. The terminal device according to claim 1, wherein the first "modulation and coding scheme" index and the second "modulation and coding scheme" index are less than 29.

3. A base station device comprising:
transmission circuitry configured to and/or programmed to:
transmit a physical downlink control channel (PDCCH), the PDCCH including downlink control information (DCI) that is used for a scheduling of a first physical uplink shared channel (PUSCH);
transmit a higher layer parameter; and
transmit a random access response, the random access response including an uplink grant; and
reception circuitry configured to and/or programmed to:
receive the first PUSCH corresponding to the PDCCH with the DCI; and
receive a second PUSCH corresponding to the uplink grant,
wherein
the DCI includes a first "modulation and coding scheme" index,
the uplink grant includes a second "modulation and coding scheme" index,
a first modulation order Qm for the first PUSCH is given based on a first index Q'm in a first table, the first index Q'm corresponding to the first "modulation and coding scheme" index based on the first table, in a case that the higher layer parameter indicating that 256 QAM is allowed is configured,
the first modulation order Qm for the first PUSCH is given based on a second index Q'm in a second table being different from the first table, the second index Q'm corresponding to the first "modulation and coding scheme" index based on the second table, in a case that the higher layer parameter indicating that 256 QAM is allowed is not configured, and
a second modulation order Qm for the second PUSCH is given, regardless of whether the higher layer parameter indicating that 256 QAM is allowed is configured, based on a third index Q'm in the second table, the third index Q'm corresponding to the second "modulation and coding scheme" index based on the second table.

4. The base station device according to claim 3, wherein the first "modulation and coding scheme" index and the second "modulation and coding scheme" index are less than 29.

5. A communication method used by a terminal device, the communication method comprising:
detecting a physical downlink control channel (PDCCH), the PDCCH including downlink control information (DCI) that is used for a scheduling of a first physical uplink shared channel (PUSCH);
receiving a higher layer parameter;
receiving a random access response, the random access response including an uplink grant;
transmitting the first PUSCH according to the PDCCH with the DCI; and
transmitting a second PUSCH according to the uplink grant,
wherein
the DCI includes a first "modulation and coding scheme" index,
the uplink grant includes a second "modulation and coding scheme" index,
a first modulation order Qm for the first PUSCH is given based on a first index Q'm in a first table, the first index Q'm corresponding to the first "modulation and coding scheme" index based on the first table, in a case that the higher layer parameter indicating that 256 QAM is allowed is configured,
the first modulation order Qm for the first PUSCH is given based on a second index Q'm in a second table being different from the first table, the second index Q'm corresponding to the first "modulation and coding scheme" index based on the second table, in a case that the higher layer parameter indicating that 256 QAM is allowed is not configured, and
a second modulation order Qm for the second PUSCH is given, regardless of whether the higher layer parameter indicating that 256 QAM is allowed is configured, based on a third index Q'm in the second table, the third index Q'm corresponding to the second "modulation and coding scheme" index based on the second table.

6. A communication method used by a base station device, the communication method comprising:
- transmitting a physical downlink control channel (PDCCH), the PDCCH including downlink control information (DCI) that is used for a scheduling of a first physical uplink shared channel (PUSCH);
- transmitting a higher layer parameter;
- transmitting a random access response, the random access response including an uplink grant;
- receiving the first PUSCH corresponding to the PDCCH with the DCI; and
- receiving a second PUSCH corresponding to the uplink grant, wherein
- the DCI includes a first "modulation and coding scheme" index,
- the uplink grant includes a second "modulation and coding scheme" index,
- a first modulation order Qm for the first PUSCH is given based on a first index Q'm in a first table, the first index Q'm corresponding to the first "modulation and coding scheme" index based on the first table, in a case that the higher layer parameter indicating that 256 QAM is allowed is configured,
- the first modulation order Qm for the first PUSCH is given based on a second index Q'm in a second table being different from the first table, the second index Q'm corresponding to the first "modulation and coding scheme" index based on the second table, in a case that the higher layer parameter indicating that 256 QAM is allowed is not configured, and
- a second modulation order Qm for the second PUSCH is given, regardless of whether the higher layer parameter indicating that 256 QAM is allowed is configured, based on a third index Q'm in the second table, the third index Q'm corresponding to the second "modulation and coding scheme" index based on the second table.

* * * * *